July 31, 1945.　　　　　　A. PATIN　　　　　　2,380,784
ELECTRIC CONTROLLING SYSTEM
Filed July 30, 1941　　　　　2 Sheets-Sheet 1

INVENTOR
Albert Patin
BY Franz Reinhold
ATTORNEY

July 31, 1945.   A. PATIN   2,380,784
ELECTRIC CONTROLLING SYSTEM
Filed July 30, 1941   2 Sheets-Sheet 2

INVENTOR
Albert Patin
BY Franz Reinhardt
ATTORNEY

Patented July 31, 1945

2,380,784

UNITED STATES PATENT OFFICE 2,380,784

ELECTRIC CONTROLLING SYSTEM

Albert Patin, Berlin, Germany; vested in the Alien Property Custodian

Application July 30, 1941, Serial No. 404,631
In Germany March 27, 1937

3 Claims. (Cl. 171—229)

My invention relates to improvements in electric controlling systems, and more particularly in controlling systems comprising means for producing a magnetic field and an electric coil or similar electric wire system movable in said field and adapted when energized by electric current to move in the said field. The object of the improvements is to provide a controlling system of this type in which the said coil or wire system is adapted to be moved by weak currents, and which therefore has high sensitiveness. With this object in view my invention consists in applying two oppositely directed voltages to the said coil or wire system, one of the said voltages being supplied by a source of electric energy which may be constant during the operation of the system, the other one being supplied by an electric controlling device associated with the apparatus to be controlled.

The said wire system may comprise a single coil which normally is held in equilibrium in the magnetic field, and which is moved in the said field only when the said voltages are unbalanced. In lieu of a single coil two coils may be provided which have oppositely acting voltages applied thereto.

Preferably the said wire system is located in a gap which is free of iron. Thereby the current needed for moving the coil is small and the sensitiveness of the system is high. Further, the movement of the coil is not impaired by inertia.

My improved controlling system may be used for controlling various apparatus, for example apparatus for regulating the voltage of a storage battery by means of a cell switch, or apparatus for regulating the number of revolutions of an engine driven by compressed air, steam or a flowing liquid, and the controlling system may be constructed so that the said apparatus are continuously or momentarily regulated. In the following I shall describe the invention in connection with various apparatus which are particularly instructive for explaining the system and its operation.

In the annexed drawings

Figure 1:
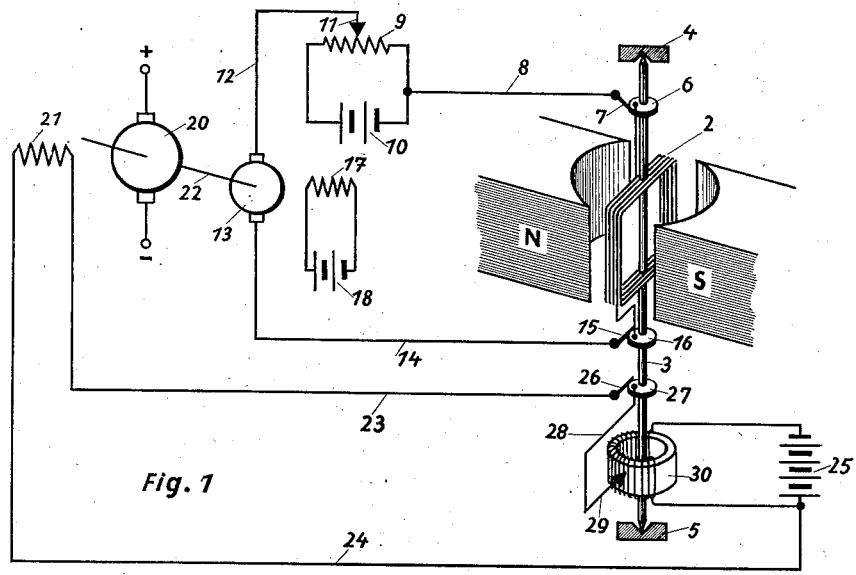
Figure 3:
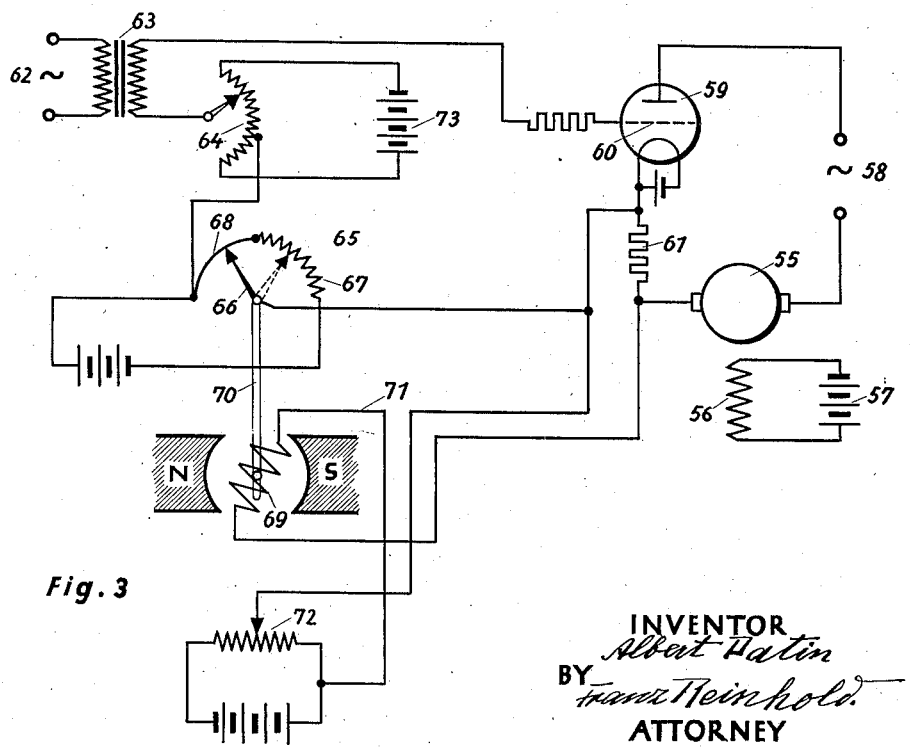
Figure 2:
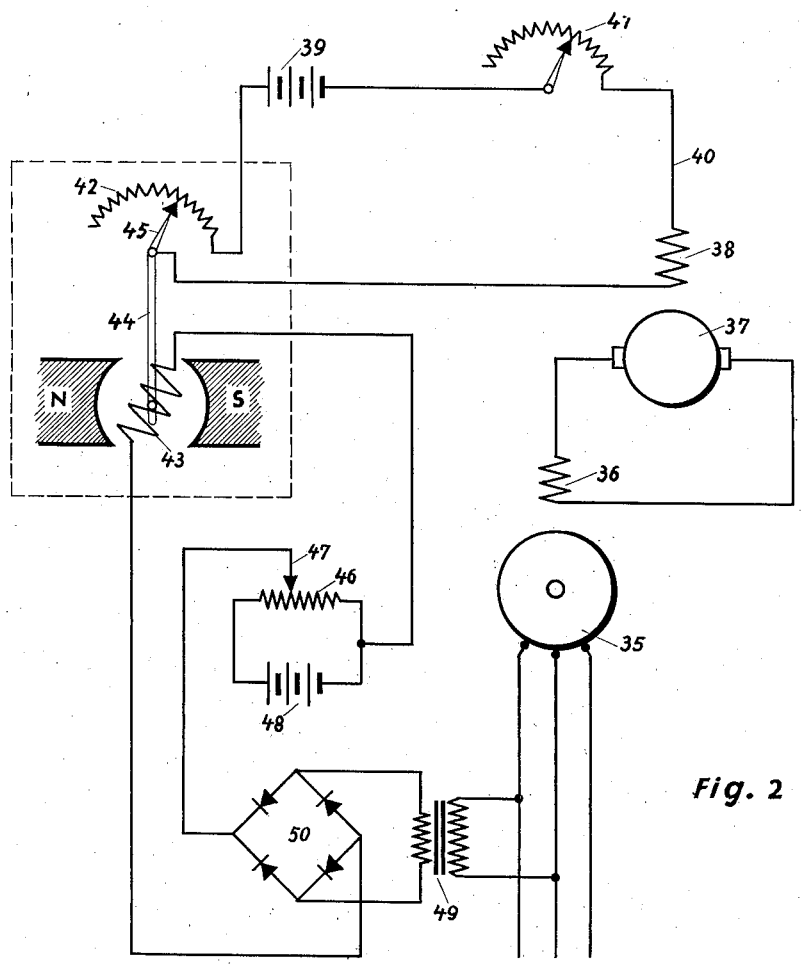

Fig. 1 is a diagrammatical elevation showing a system for controlling an electric motor, Fig. 2 is a similar diagrammatical view showing a system controlling the voltage of a generator under varying conditions of load, and Fig. 3 is a similar diagrammatical view showing the system as used for controlling the current supplied to a direct current motor, so as to prevent overcharge, for example, when the motor is started.

In the example shown in Fig. 1, the controlling system comprises a permanent magnet or a constant electromagnet indicated in the figure by the signs N—S. In the field of the said magnet an electric wire system is movable, which, as shown, consists of a single coil 2 carried by a rotatable spindle 3 mounted in bearings 4 and 5. To the terminals of the said coil voltages are applied so as to act in opposition to each other, and normally the said voltages are alike. One of the terminals of the said coil is connected to an insulated ring 6 secured to the spindle 3 and having a contact spring 7 in sliding engagement therewith the said contact spring being connected by a lead 8 with a voltage divider 9 connected with a source of electric energy such as a battery 10. The slide contact 11 of the said voltage divider is connected by a lead 12 with a tachometer-dynamo 13 the voltage of which is exactly proportional to the number of revolutions, and the said dynamo is connected by a lead 14 with a contact arm 15 sliding on an insulated ring 16 fixed to the spindle 3 and connected with the second terminal of the coil 2. The field winding 17 of the dynamo 13 is energized by means of a battery 18.

By means of the voltage divider 9 and the dynamo 13 oppositely directed voltages are applied to the coil 2, and normally, that is while the system is balanced, the said voltages are alike so that no current flows through the coil. If, however, the velocity of the dynamo departs from the normal, the coil 2 is energized and it turns about the axis of the spindle 3. The coil is movable in a gap which is free of iron, and therefore, it is moved by very small currents, and its movement is not retarded by inertia.

In the construction shown in the figure the system is intended to control an electric motor 20 having a field winding 21, the object being to maintain the number of revolutions of the electric motor constant. The armature of the electric motor 20 is positively coupled with the armature of the dynamo 13 as is indicated by the common shaft 22. The field winding 21 of the electric motor is connected by leads 23 and 24 respectively with a source of electric energy such as a battery 25 and with a slide contact 26 engaging an insulated ring 27 fixed to the spindle 3. The said ring 27 is connected by a lead 28 with a contact arm 29 engaging a relatively fixed potentiometer 30, the winding of which is connected to the terminals of the battery 25. Thus the current supplied to the field winding 21 depends on the position of the contact arm 29 on the winding of the potentiometer 30.

The operation of the system is as follows:

The slide contact 11 of the voltage divider 9 is placed on the resistance of the said divider into a position such that the voltage applied from the battery 10 of the divider to the ring 6 connected with the coil 2 is equal to the voltage developed by the dynamo running at the desired speed. Thus, while the electric motor runs at the said desired speed no current flows through the coil 2. If, however, for some reason or other the electric motor changes its velocity, the voltage developed by the dynamo 13 is varied and therefore the coil 2 is energized. Thus, the said coil turns with its spindle 3, and thereby the slide contact 29 is shifted on the potentiometer 30 in one or the other direction and, accordingly, the current supplied by the battery 25 to the field winding 21 is varied. Thereby the speed of the electric motor is varied, until it has attained its normal value, whereupon the coil 2 is deenergized. The coil 2 and slide contact 29 remain in the new position until another regulation is needed.

In Fig. 2 I have illustrated the improved controlling system in connection with a three-phase current dynamo for regulating the voltage of the current generated by the said dynamo in case of varying load.

The phases of the said dynamo and the field winding have been indicated respectively by the numerals 35 and 36. The field winding is energized by a direct current dynamo 37 the field winding 38 of which is energized by a suitable source of electric energy such as a battery 39. The circuit 40 of the field winding includes a resistance 41 adapted to be regulated by hand, and a second regulatable resistance 42. By means of the resistances 41 and 42 the current supplied to the field winding 38 and therefore the voltage of the dynamo 37 and the current supplied to the field winding 36 of the three-phase current dynamo are regulated in accordance with the load of the said dynamo.

The controlling system comprises means for producing a constant magnetic field indicated by the signs N—S, and a coil 43 carried by a spindle 44 and rotatable in the said magnetic field. The said spindle 44 is connected with a slide contact 45 engaging the resistance 42. In the figure the spindle 44 has been indicated diagrammatically, and it will be understood that it is disposed so as to permit the coil 43 to rotate in the magnetic field. The coil is energized by two sources, one a circuit divider 46 having a slide contact 47 and included in a circuit comprising a source of electric energy represented by a battery 48, and the other one a transformer 49 the primary of which is connected across two phases of the dynamo 35, 36. The secondary of the said transformer 49 is connected with a rectifier 50 included in circuit with the coil 43 and the circuit divider 46, 47, 48, and the voltages of the said rectifier and voltage divider act on the coil in opposition to each other.

The operation of the system is as follows:

The voltage divider 46, 47, 48 is set so that the voltage applied thereby to the coil 43 is equal to that of the rectifier 50, and no current flows through the coil. If the load of the dynamo 35, 36 is varied, the voltage across the phases and the voltage of the rectifier are reduced or increased. Thus the rectifier 50 and the circuit divider 46, 47 are unbalanced, and current flows through the coil 43. The said coil is rotated and such rotary movement is transmitted to the switch arm 45, which therefore varies the resistance 42 and the current energizing the field coil 38. Thereby the energization of the field coil 36 of the three-phase current dynamo is changed, until the voltage of the current generated by the phases 35 is again normal.

While in the system shown in Fig. 2 the voltage of the dynamo 35, 36 is regulated by varying the energization of the field winding 36, I wish it to be understood that my invention is not limited to the regulation shown in the figure. For example, the voltage may be regulated by varying the number of revolutions of the engine driving the dynamo, in which case suitable regulating devices are interposed between the coil 43 and the parts connected therewith, and the said engine.

In Fig. 3 I have shown my improved controlling system in connection with a direct current electric motor for preventing an excessive increase of the armature current, for example when the motor is started or overloaded.

The direct current dynamo comprises an armature 55 and a field winding 56 which is energized by a battery 57. To the armature 55 current is supplied from a source of alternating current indicated by the reference numeral 58 through a gas filled rectifier 59 having a grid 60. The anode circuit of the said rectifier includes a resistance 61. The voltage of the current supplied from the rectifier 59 to the armature 55 is regulated by varying the voltage applied to the grid 60. Preferably the phase of the said voltage is displaced with relation to the phase of the anode at an angle of 90°. The voltage is applied to the grid 60 from a source of alternating current 62 through a transformer 63. For regulating the anode voltage of the rectifier 59 a direct voltage is applied to the grid in addition to the voltage applied thereto from the transformer 63, and for this purpose a potentiometer 64 connected with a battery 74 and adapted to be set by hand is connected with the grid 60, and in addition a potentiometer 65 is connected to the grid the contact arm 66 of which slides on a resistance 67 and a rail 68. Normally the arm 66 is in engagement with the rail 68, and it is shifted into engagement with the resistance 67 only when the current supplied to the electric motor 55 exceeds the desired maximum. The potentiometer 64 is adapted to be regulated by hand, while the potentiometer 65 is regulated by means of my improved controlling system.

The said controlling system comprises a constant magnet indicated by the letters N—S and a coil 69. The said coil is carried by a spindle indicated diagrammatically at 70 and carrying the slide contact arm 66. Thus, when the coil 69 is rotated in the field N—S the contact arm is shifted from the rail 68 to the resistance 67 or vice-versa. The coil 69 is included in a circuit 71 including a voltage divider 72 and the resistance 61, the voltage divider 72 applying one of the voltages to the coil 69, and the potential difference at the terminals of the resistance 61 providing the other voltage acting in opposition to the voltage of the voltage divider 72.

The operation of the system is as follows:

The contact arm 66 is set on the rail 68, and the contact arm of the voltage divider 64 is set so that the highest permissible current may flow through the armature 55 without the coil 69 being energized and turned in a direction for shifting the contact arm 66 on the resistance 67. By the said current a potential difference is produced at the terminals of the resistance 61, which counteracts the voltage taken from the voltage divider 72 so that the current flowing through the coil 69 is either zero or tends to turn the contact arm 66 anticlockwise and away from the resistance 67. If now the current flowing through the armature is increased beyond the permissible maximum the potential difference at the terminals of the resistance 61 is increased, and the coil 69 is energized so as to turn the contact arm 66 clockwise. Thereby the direct voltage applied from the battery 73 to the grid 60 is altered in such a way that the time of ignition of the rectifier 50 is displaced and the current flowing through the rectifier is held below the desired maximum.

While in describing the invention reference has been made to various systems embodying the same I wish it to be understood that my invention is not limited to the examples shown in the drawings, and that my controlling system may be used in connection with other apparatus where regulation of any values is needed.

An important feature of the new controlling system consists in that the system may be set so that the regulation or other controlling operation takes place under definite conditions. The controlling system may be used either for directly or indirectly acting on a regulating member, either by means of electrical or mechanical means. It will be understood that the general arrangement and the details of the construction of the controlling system may be adapted to the requirements of the system to be controlled thereby.

I claim:

1. In an electrical control system for maintaining a condition in balance, a variable resistance including a resistance element and a relatively movable contact element, said relative movement serving to effect a change in the condition to be balanced, a stationary permanent field magnet having opposed pole faces, a rotatable shaft, an air-core coil mounted for oscillation between said pole faces on said shaft through the angle subtended by said pole faces whereby the coil is permitted to swing between two extreme positions, one of said elements being fixed upon said shaft to transmit forces to change the effective resistance of said variable resistance unit, means setting up a magnetic field about said solenoid, and circuit means connected to supply current to said solenoid comprising a potentiometer and an auxiliary source of current connected in series, said potentiometer having the characteristic that its effective voltage normally remains substantially constant, and said auxiliary source of current have a voltage which is equal to the effective voltage of said potentiometer when the system is in balance but which is respectively greater or less than the effective voltage of the potentiometer when the system is unbalanced whereby a current flows through said solenoid of proper direction and magnitude to cause said solenoid to swing in said magnetic field and correct the unbalance.

2. In an electrical control system in which a condition is regulated by varying a control current, a resistor assembly including a resistance element and a relatively movable contact element, said relative movement serving to change the value of said current, a pair of spaced magnets having opposed pole faces for setting up a magnetic field, a rotatable shaft, an air-core coil mounted for oscillation between said pole faces on said shaft through an angle subtended by said pole faces whereby the coil is permitted to swing between two extreme positions, one of said elements being fixed upon said shaft to cause the movements of said fixed element to change the effective resistance of said resistor assembly, and current supply means to supply currents of the proper magnitude and direction to said coil in accordance with the change in said control current whih is to be effected, said current supply means comprising a potentiometer and an auxiliary current source connected in series, said potentiometer having a predetermined substantially constant effective voltage and said auxiliary current source having a voltage which is substantially equal to said effective voltage under normal conditions but which is greater or less than said effective voltage when a change of corresponding magnitude and direction is to be made in said control current, whereby a current flows through said coil originating in said potentiometer if the change in said control current is to be made in one direction and originating in said auxiliary current source if the change in the control current is to be in the other direction with the current in the coil at all times having a magnitude appropriate to the change to be effected in the control current.

3. In an electrical control system in which a condition is regulated by a control assembly and wherein the control assembly includes means constituting sources of opposed voltages connected in series and being equal and opposite when the condition being regulated has the desired value, and wherein a desired change in the condition is evidenced by an unbalancing of the voltages with the result that a correcting current flows in a control circuit through a current responsive device, that improvement which consists in providing a current responsive device comprising, a stationary permanent field magnet having opposed pole faces, a rotatable shaft, an air-core coil mounted for oscillation between said pole faces on said shaft through the angle subtended by said pole faces whereby the coil is permitted to swing between two extreme positions wherein the magnetic axis of the coil is moved toward alinement with the magnetic field of the permanent magnetic, said coil having the characteristic that it remains stationary when no correcting current is flowing and that when a correcting current flows it will move in a direction and at a speed depending upon the direction and magnitude of the current, a controlled circuit including a resistance element and a contact element, one of said elements being mounted on said shaft.

ALBERT PATIN.